Nov. 20, 1923.
P. JARAY
AIRCRAFT CAR
Filed Oct. 14, 1920
1,474,529
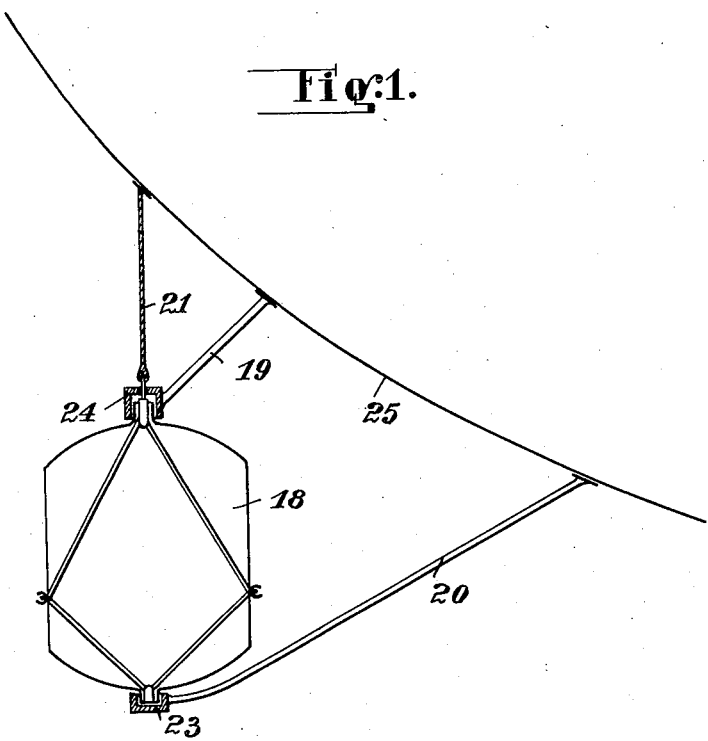
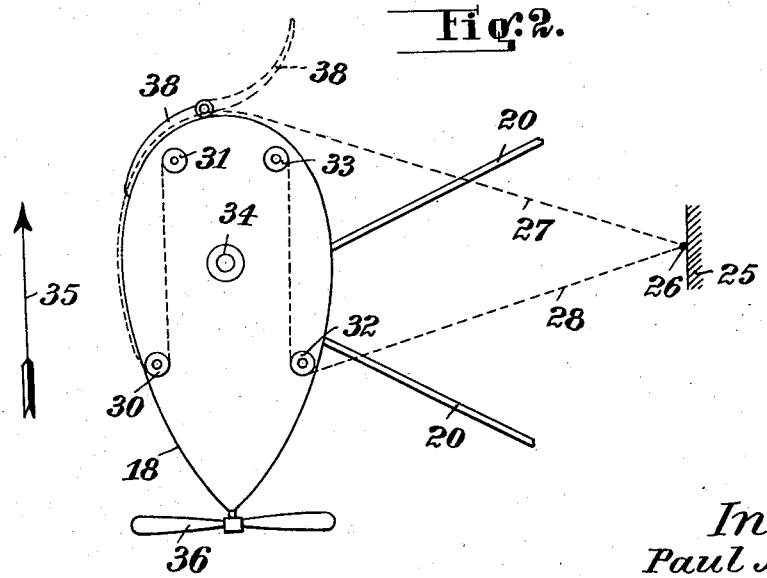
Inventor
Paul Jaray
By [signature]
Attorney.

Patented Nov. 20, 1923.

1,474,529

UNITED STATES PATENT OFFICE.

PAUL JARAY, OF FRIEDRICHSCHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

AIRCRAFT CAR.

Application filed October 14, 1920. Serial No. 417,064.

*To all whom it may concern:*

Be it known that I, PAUL JARAY, a citizen of the Austrian Republic, residing at Friedrichshafen, Germany, have invented certain new and useful Improvements in Aircraft Cars, of which the following is a specification.

My invention refers to the cars of aerial vehicles and more especially to the way the car is supported in the aerial vehicle itself.

It is well known that in aerial vehicles and quite especially in those possessing gas bags it is desirable to reverse the action of the propellers acting in the direction of propulsion for a shorter or longer period or to cause them to act upon the vehicle at a somewhat oblique angle or even at right angles to the longitudinal axis.

To be able to reverse them is almost a necessity in view of a reduction of the run out when landing. Until now it could only be done effectually by means of reverse gears, especially in connection with the reversible propeller. If absolute reliability is required, even a most careful calculation according to all rules of modern engineering results in a rather complicated engine plant of very great weight. The present invention now improves conditions considerably by creating in a very simple way a possibility of reversing the action of the propellers. This is attained by arranging the car and the whole engine plant cntained in it revolubly around an axis fairly perpendicular to the equator of the airship. Thus a further advantage is ensured which until now could not be obtained by simple means. The action of the propellers can by turning the engine car correspondingly obliquely to the longitudinal direction of the ship be brought to bear upon the air craft itself. This is a special advantage e. g. in taking the airship out of the shed in a cross wind, because an engine power of fairly the same direction can be set against lateral wind pressure, or the simultaneous motion can be taken into consideration by forming a corresponding angle between the force of the wind and the forces produced by the propellers and by thus generating a component of advancement.

Revolubility can be attained in different ways, preferably by using winches or spindles or by means of ropes. The car for safety's sake may be designed in such manner that it can be fixed in several positions, but this is not absolutely necessary. The fixing can be provided for all positions or only for a few positions chiefly used. The turning of the car will generally take place up to practically 180° and back to 0° only. As a rule the car will be turned shortly before landing and while the airship is travelling at full speed; it will be turned back into its original position either during a stop or while the airship travels at reduced speed.

For these reasons, in order to make turning easier, it is advisable to locate the pivot to the rear with regard to the centre of wind pressure so that the draught of motion assists the turning motion. Thus turning is made especially easy, since the resistance to air of that half of the car which lies in front of the turning point, is thus greater than that of the rear half and the difference results in a turning moment in the direction of the intended turning motion of the car. Considering that a turning motion around a point some way removed from the centre of gravity entails after all some constructive difficulties, in further evolving the idea of the invention an easier turning is obtained by the fact that in the front half of the car folding resistance planes may be disposed.

In the drawings affixed to this specification and forming part thereof an airship car embodying my invention is illustrated diagrammatically by way of example:

Fig. 1 is a vertical section and

Fig. 2 is a plan.

Referring to the drawings, 18 is a car attached to the airship body 25 by means of struts 19 and 20 and a wire rope 21. Revolubility is obtained by supporting the car in its lowest part in a thrust bearing 23 carried by two struts 20 and by guiding it on top in a bearing 24 held by the two struts 19.

To the body of the airship two cables 27 and 28 are attached at 26, the former being conducted from bow to stern on the port side, then around a rope pulley 30 to a windlass 31. Rope 28 is lead to the stern of the car and round a pulley 32 to windlass 33. The pivot turning 34 of the car is arranged so that the resistance to air in going ahead acts in the direction of arrow 35, the propeller 36 acting as a thrust propeller.

The winding back is done after propeller 36 is stopped, i. e., mainly at a standstill. If the car shall be turned while going astern the return movement would be again assisted by the draught of the motion. The car 18 has moreover arranged close to its bow a resistance surface 38 adapted to be swung outwards. When swung out, it assists the turning moment, as it enlarges greatly the resistance to the air in front of the turning point and thus considerably assists the turning motion. Moreover the surface 38 ensures a regulation of the turning movement, as it can be swung out more or less by means of a lever or rope appliance (not shown).

The application of the invention is mainly intended for air craft possessing gas bodies, though its application to flying machines might prove equally advantageous.

I wish it to be understood that I do not desire to be limited to the exact details of construction shown and described, for obvious modifications will occur to a person skilled in the art.

I claim:

1. In aircraft in combination, a hull, a car connected with said hull so as to be capable of turning about a vertical axis and a cable of variable length extending around part of the wall of said car and attached at one end to the hull for turning said car.

2. In aircraft in combination, a hull, a car connected with said hull so as to be capable of turning about a vertical axis and cables of variable length extending around part of the wall of said car, the free ends of said cables being attached to said hull.

3. In aircraft in combination, a hull, a car connected with said hull so as to be capable of turning about a vertical axis, cables of variable length extending around part of the wall of said car, the free ends of said cables being attached to said hull and a windlass on said car for varying the length of said cables.

4. In aircraft in combination, a hull, a car connected with said hull so as to be capable of turning about a vertical axis, a cable of variable length extending around part of the wall of said car and attached at one end to the hull for turning said car and a resistance plane pivoted to the forward portion of said car.

5. In aircraft in combination, a hull, a car connected with said hull so as to be capable of turning about a vertical axis and means extending around part of the wall of said car for turning this latter, said turning axis being disposed to the rear of the centre of gravity.

In testimony whereof I affix my signature.

PAUL JARAY.